(12) United States Patent
Esseghir et al.

(10) Patent No.: US 10,384,380 B2
(45) Date of Patent: Aug. 20, 2019

(54) METHOD TO MANUFACTURE MULTI-LAYER ELECTRICAL ARTICLE

(71) Applicant: Dow Global Technologies LLC, Midland, MI (US)

(72) Inventors: Mohamed Esseghir, Lawrenceville, NJ (US); Christopher J. Siler, Hemlock, MI (US); Scott T. Burr, Midland, MI (US); Franklin J. Flavin, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 540 days.

(21) Appl. No.: 14/782,435

(22) PCT Filed: Mar. 18, 2014

(86) PCT No.: PCT/US2014/030954
§ 371 (c)(1),
(2) Date: Oct. 5, 2015

(87) PCT Pub. No.: WO2014/182373
PCT Pub. Date: Nov. 13, 2014

(65) Prior Publication Data
US 2016/0052183 A1  Feb. 25, 2016

Related U.S. Application Data

(60) Provisional application No. 61/820,227, filed on May 7, 2013.

(51) Int. Cl.
*B29C 45/14* (2006.01)
*B29C 45/34* (2006.01)
(Continued)

(52) U.S. Cl.
CPC .... *B29C 45/14491* (2013.01); *B29C 35/0222* (2013.01); *B29C 45/14639* (2013.01);
(Continued)

(58) Field of Classification Search
CPC .............. B29C 33/10; B29C 45/14491; B29C 35/0222; B29C 45/14639; B29C 45/34;
(Continued)

(56) References Cited

U.S. PATENT DOCUMENTS

| 464,475 | A | | 12/1891 | Fisher | |
|---|---|---|---|---|---|
| 1,436,738 | A | * | 11/1922 | Underhill | ................ H01M 2/04 215/307 |

(Continued)

FOREIGN PATENT DOCUMENTS

| DE | 3226506 A1 | 3/1983 |
|---|---|---|
| DE | 10147158 A1 | 4/2003 |

(Continued)

OTHER PUBLICATIONS

Shayfull, Z. Effect of Differences Core and Cavity Temperature on Injection Molded Part and Reducing the Warpage by Taguchi Method, International Journal of Engineering & Technology, vol. 10 No. 6, Dec. 2012, p. 130.*

(Continued)

*Primary Examiner* — William P Bell
*Assistant Examiner* — Andrew L Swanson
(74) *Attorney, Agent, or Firm* — Husch Blackwell LLP (57) ABSTRACT

A process for making a multilayered article, the process comprising the steps of: (A) Providing a mold comprising: (1) A mold housing comprising (a) at least one injection port, and (b) defining a mold cavity within which are positioned two deformable, pre-molded polymeric sheets; and (2) A removable, hollow core equipped with at least one vent, the removable, hollow core positioned between and space apart (Continued)

Full Length Porcerax Vent Locations from the two polymeric sheets; (B) injecting under high pressure a viscous, crosslinkable, thermoplastic polymer into the mold cavity between the two polymeric sheets and around the removable core, (C) Drawing a vacuum on the mold cavity through both the vent in the mold housing and the vent in the removable, hollow core before, during and/or after the polymer has been injected into the mold; (D) Forming a less than fully cured multilayered article in the mold cavity; and (E) Removing the less than fully cured multilayer article from the mold cavity.

9 Claims, 8 Drawing Sheets (51) Int. Cl.
  *B29C 35/02* (2006.01)
  *H02G 1/14* (2006.01)
  *H02G 15/184* (2006.01)
  *H01B 19/00* (2006.01)
  *B29C 45/44* (2006.01)
  *H01B 3/30* (2006.01)
  *B29K 101/12* (2006.01)
  *B29K 105/24* (2006.01)
  *B29L 31/34* (2006.01)

(52) U.S. Cl.
  CPC ............ *B29C 45/34* (2013.01); *B29C 45/345* (2013.01); *H02G 1/145* (2013.01); *H02G 15/184* (2013.01); *B29C 45/14344* (2013.01); *B29C 45/44* (2013.01); *B29K 2101/12* (2013.01); *B29K 2105/24* (2013.01); *B29L 2031/3462* (2013.01); *H01B 3/30* (2013.01); *H01B 19/00* (2013.01)

(58) Field of Classification Search
  CPC ... B29C 5/345; B29C 45/14344; B29C 45/44; H02G 1/145; H02G 15/184; B29K 2101/12; B29K 2105/24; B29L 2031/3462; H01B 3/30
  See application file for complete search history.

(56) References Cited

U.S. PATENT DOCUMENTS

| | | | |
|---|---|---|---|
| 3,816,640 A * | 6/1974 | Varner | ............... H02G 15/18 156/49 |
| 3,846,578 A | 11/1974 | Bahder et al. | |
| 3,970,735 A | 7/1976 | Nelson | |
| 5,246,783 A | 9/1993 | Spenadel et al. | |
| 5,254,304 A * | 10/1993 | Adachi | ............... B29C 45/00 264/328.1 |
| 5,272,236 A | 12/1993 | Lai et al. | |
| 5,278,272 A | 1/1994 | Lai et al. | |
| 5,582,844 A | 12/1996 | Roose | |
| 5,779,963 A * | 7/1998 | Chappaz | ............... B29C 37/005 264/250 |
| 5,986,028 A | 11/1999 | Lai et al. | |
| 6,496,629 B2 | 12/2002 | Ma et al. | |
| 6,714,707 B2 | 3/2004 | Rossi et al. | |
| 6,796,820 B2 | 9/2004 | Jazowski et al. | |
| 2003/0134538 A1* | 7/2003 | Bolcar | ............... H01B 3/28 439/607.41 |
| 2005/0220925 A1* | 10/2005 | Inada | ............... B29C 45/2642 425/408 |

FOREIGN PATENT DOCUMENTS

| | | | | |
|---|---|---|---|---|
| EP | | 782151 A1 | 7/1997 | |
| EP | | 0886342 A1 | 12/1998 | |
| EP | | 1806217 A1 | 7/2007 | |
| GB | | 2085347 A | 4/1982 | |
| GB | | 2268005 A | 12/1993 | |
| JP | | S57-194293 U | 12/1982 | |
| JP | | S59113992 U | 8/1984 | |
| JP | | S605087 U | 1/1985 | |
| JP | | S62191087 U | 12/1987 | |
| JP | | H07-256704 A | 10/1995 | |
| JP | | H07336837 | * 12/1995 | ............ H01R 43/00 |
| JP | | H07336837 A | 12/1995 | |
| JP | | H08236242 A | 9/1996 | |
| JP | | 2000-238058 A | 9/2000 | |
| JP | | 2003-094495 A | 4/2003 | |
| JP | | 2012-091330 A | 5/2012 | |
| JP | | 2012091330 A | * 5/2012 | |
| WO | | 2010/076166 A1 | 7/2010 | |
| WO | | 2012/044499 A1 | 4/2012 | |
| WO | WO 2012044499 A1 | * 4/2012 | ....... B29C 45/14467 | |

OTHER PUBLICATIONS

Rosato, Injection Molding Handbook, 2000, Springer, 3rd Edition, p. 307-313 (Year: 2000).*
Rosato, Injection Molding Handbook, 2000, Springer, 3rd Ed., p. 32 (Year: 2000).*
Dundas, Porous Steel Improves Mold Venting, Modern Machine Shop, Dec. 15, 2001 (Year: 2001).*

* cited by examiner

Figure 4
Splice Molded with Sintered Metal Vents

Figure 5
Spliced Molded with Sintered Steel Core and Vacuum

Figure 6
Splice Made with Pin Vent and Vacuum

Figure 7

Splice Molded with Sintered Metal Vents

Figure 8

Splice Molded with Sintered Steel Core and Vacuum

Figure 9

Splice Made with Pin Vent and Vacuum

Figure 10
Pen Vent Locations

Figure 11A
First Pin Vented Core

Figure 11B
Pin with Flat

Figure 12A
Multiple Pin Vent Concept

Location of Local Sintered Steel Vents

Figure 17A

Porcerax on Connecting Rod

Full Length Porcerax Vent Locations

Figure 19A

Full Length Porcerax Vent Construction

Transparent View of Porcerax Vented Core

METHOD TO MANUFACTURE MULTI-LAYER ELECTRICAL ARTICLE

FIELD OF THE INVENTION

This invention relates to electrical articles. In one aspect the invention relates to a method of molding electrical articles while in another aspect, the invention relates to the molding of electrical articles using an off-mold, latent cure.

BACKGROUND OF THE INVENTION

Technology has been developed to enable efficient manufacture of electrical articles, such as power accessories, using a thermoplastic molding approach followed by an off-mold, latent cure (as opposed to standard in-mold vulcanization). Many design variations exist, but generally these articles comprise three-layers, i.e., (a) an inner semi-conductive sleeve referred to as the faraday cage, (b) an outer semi-conductive layer referred to as the jacket, and (c) a thick layer in between the two semi-conductive (a) and (b) layers, this thick layer made of an electrically insulating material and referred to as the insulation layer.

The new technology allows for the article to be molded in a standard thermoplastic injection molding process, and then cured off-mold at ambient conditions. Since not cured in the mold, one important requirement during the molding operation is to cool these thick articles enough to achieve geometrical integrity prior to demolding. The molding cycle is thus controlled by the efficiency of cooling the article inside the mold and achieving appropriate green strength for demolding. For this to work, the operation typically uses a chilled mold, one that is maintained below the melting temperature of the polymer(s) from which the article is made. This is very different from conventional in-mold vulcanization in which the material is injected and cured in a high temperature mold.

This off-mold cure method poses unique challenges including material solidification in undesired location, air entrapment, etc., which can results in article defects. In addition, given the typically elastomeric nature of the materials used, issues exist regarding layer deformation during injection and these, in turn, can lead to unacceptable article quality. This invention pertains to a molding method to solve the problem and enable the production of defect-free parts.

SUMMARY OF THE INVENTION

In one embodiment the invention is a process for making a multilayered article, the process comprising the steps of:
(A) Providing a mold comprising:
  (1) A mold housing comprising (a) at least one injection port, and (b) defining a mold cavity within which are positioned two deformable, pre-molded polymeric sheets; and
  (2) A removable, hollow core equipped with at least one vent, the removable core positioned between and space apart from the two polymeric sheets;
(B) Injecting under high pressure a viscous, crosslinkable, thermoplastic polymer into the mold cavity between the two polymeric sheets and around the removable core,
(C) Drawing a vacuum on the mold cavity through the vent in the removable, hollow core before, during and/or after the polymer has been injected into the mold;
(D) Forming a less than fully cured multilayered article in the mold cavity; and
(E) Removing the less than fully cured multilayer article from the mold cavity.

In one embodiment the invention is a mold comprising:
(A) A mold housing comprising (a) at least one injection port, and (b) defining a mold cavity within which are positioned two deformable, pre-molded polymeric sheets; and
(2) A removable, hollow core equipped with at least one vent, the removable, hollow core positioned between and space apart from the two polymeric sheets.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the strength of the vacuum draw on the mold cavity and the injection pressure of the crosslinkable, thermoplastic polymer.

"Comprising", "including", "having" and like teems mean that the composition, process, etc. is not limited to the components, steps, etc. disclosed, but rather can include other, undisclosed components, steps, etc. In contrast, the term "consisting essentially of" excludes from the scope of any composition, process, etc. any other component, step etc. excepting those that are not essential to the performance, operability or the like of the composition, process, etc. The term "consisting of" excludes from a composition, process, etc., any component, step, etc. not specifically disclosed. The term "or", unless stated otherwise, refers to the disclosed members individually as well as in any combination.

"Cable", "power cable" and like terms means at least one conductive wire or optical fiber within a protective jacket or sheath. Typically a cable is two or more wires or optical fibers bound together, typically in a common protective jacket or sheath. The individual wires or fibers may be bare, covered or insulated. Combination cables may contain both electrical wires and optical fibers. The cable, etc., can be designed for low, medium or high voltage applications. Typical cable designs are illustrated in U.S. Pat. Nos. 5,246,783, 6,496,629 and 6,714,707.

Mold

Figure 1A:
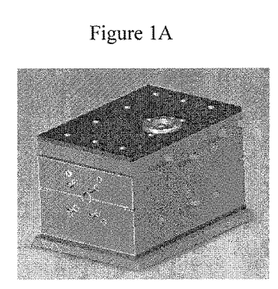
FIGS. 1A, 1B and 1C are illustrations of a mold used in the practice of this invention in both an assembled and disassembled state.
Figure 1B:
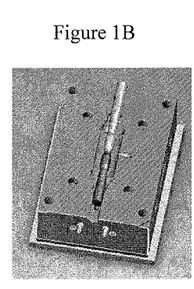
Figure 1C:
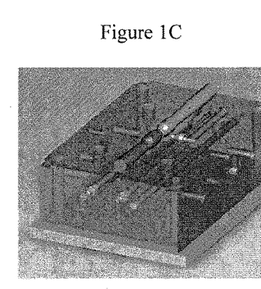

FIGS. 1A-1C show mold housing 10 in an assembled and disassembled state. Mold housing 10 comprises first or top section 10A and second or bottom section 10B. Cavity 11 is formed by the mating of mold housing sections 10A and 10B and it matches the outside shape of the molded part. Removable core 12 with inner and outer pre-molded components (e.g., the inner and outer layers of a three-layer molded article) mounted upon it, is placed into mold cavity 11 when the mold is in its disassembled state. These inner and outer component layers are pre-molded in separate molding operations, and then placed on the removable core. The core is held in place by positioning it in the mold cavity with its ends placed in the matching cutouts on the mold sections as shown. Injection port 13 is typically positioned near the center of the mold housing, but it can be positioned elsewhere as desired. Width cooling line 14 and length cooling line 15 traverse the mold housing, and cooled fluid circulates through the mold for mold temperature control. Article venting occurs through the removable core at the center of the article.

Figure 2:
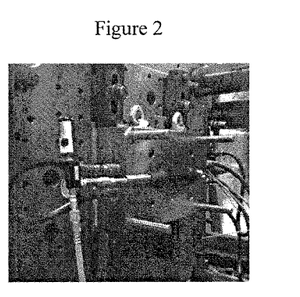
FIG. 2 is an illustration of the mold of FIG. 1B in which a vacuum pulling apparatus is attached to a removable core.

FIG. 2 shows pre-molded component 16 on removable core 12 which is positioned within bottom mold section 10B and below vacuum pulling apparatus 17 (which is also shown positioned within the mold. The vacuum pulling apparatus comprises a compressed air powered vacuum pulling system (not shown) attached to removable core 12. The apparatus is controlled via a foot pedal (not shown) but it can be set-up to be actuated automatically upon the closing of the mold.

The mold of this invention, which is used in the practice of the process of this invention, comprises (a) at least one injection port and, (b) defines a mold cavity. The housing can be made of any material that can sustain the temperature and pressure of the molding process, and it can be constructed in a single, integrated piece or in multiple pieces which require assembly for use. Typically the mold housing is a multi-piece construction that allows for easy de-molding of the molded article, and the mold housing pieces are designed so that when assemble the mold is sufficiently sturdy to withstand the conditions of the molding process. The interior walls of the housing can comprise ribs or the like that can serve as wall reinforcement and/or impediments to the movement of the elastomeric sheets during the injection of the polymer. The assembled mold housing is held together using any convenient technology, e.g., bolts, interlocking design, etc. The mold housing can be of any size, shape and design.

The size, shape and placement on the mold housing of the injection port can vary to convenience. Typically the mold housing comprises one injection port.

The mold is, of course, hollow and as such, the mold housing defines one or more mold cavities, typically one cavity. The size, shape and design of the cavity can also vary to convenience. The thickness of the mold housing, i.e., the thickness of the walls that define the mold cavity, is a function of, among other things, the composition and design of the mold housing and the conditions of the molding process. Other than the openings provided by the injection port and vents, the mold cavity is not in fluid communication with its surrounding environment.

Within the mold housing are positioned at least two deformable, pre-molded polymeric sheets, each spaced apart from the other. If a three-layered article is to be made, then the two sheets become the exterior layers of the article. The composition of the sheets is not important to the practice of this invention, and will vary to the requirements of the ultimate end use of the molded article.

Figure 3:
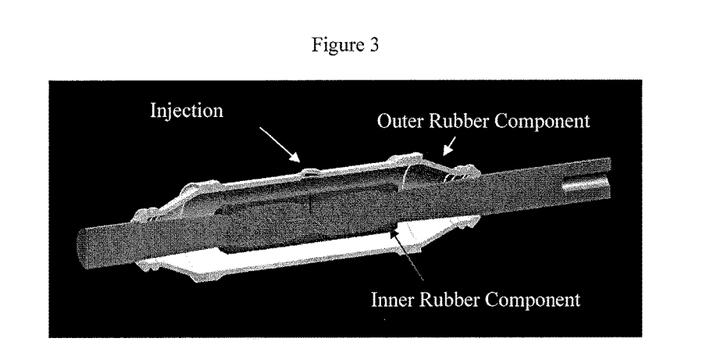
FIG. 3 is an illustration of inner and outer layers of a 3-layered article attached to a removable core prior to injection of a middle layer of polymer.

FIG. 3 shows pre-molded inner and outer elastomeric layer components mounted on the removable core. First inner pre-molded layer 16A is mounted and positioned at the center of removable core 12, and then outer pre-molded layer 16B is mounted on core 12 and covers inner layer 16A completely leaving space 18 between the two layers to be filled by insulation material. The core assembly (core 12 (typically metal) plus pre-molded layers 16A and 16B mounted on it) is then placed in the mold housing. Inner component 16A is supported by removable core 12 and outer component 16B is mounted on removable core 12 at each of its ends and outer component 16B is rigid enough to retain its shape on removable core 12. The outside surface of outer pre-molded layer 16B fits within and is constrained by the mold housing during injection of the insulation. The insulation is injected into space 18, i.e., the space between the inner and outer pre-molded layers. In one embodiment as shown in FIG. 3, injection port 13 is located on the mold such that the insulation enters space 18 at about the center of space 18.

The mold also comprises a removable, hollow core equipped with at least one vent. The core is sized and shaped to fit within the mold cavity in a manner to allow the mold housing to sufficiently seal and allow injection of the crosslinkable thermoplastic polymer under molding conditions. Typically the core comprises multiple vents that are in fluid communication with the environment outside the mold.

In one embodiment the core comprises at least one pin vent. A pin vent is a passageway in the core that allows fluid communication between the mold cavity and the exterior of the mold through a hollow or void within the core. The number, size and placement of these vents can vary, but typically the core is equipped with a plurality of vents that are sized to allow an effective vacuum to be drawn on the mold cavity before, during and/or after the crosslinkable, thermoplastic polymer has been injected into the mold cavity. These pin vents are placed on the core in those locations were gas would otherwise be trapped within the mold cavity. Pin vents are illustrated in Inventive Examples 3 and 5.

In one embodiment the core comprises at least one washer vent. In this design the face of a washer is machined to form a channel through which trapped gas can escape during the injection process. This vent comprises at least on machined washer in contact with at least one flat washer, i.e., a washer that has not been machined. The facial surfaces of these washers are brought into contact with one another, and then are placed in fluid communication with the void within the core and ultimately the environment external to the mold. Washer vents are illustrated in Inventive Example 6.

In one embodiment the core comprises a sintered metal vent. Sintered metals are metals that have undergone a sintering process, and they are typically porous. One representative example is PORCERAX, a sintered, porous metal with porosity in the range of 20 to 30% by volume. A system of interconnected pores with an average diameter of 7 or 20 micron is dispersed throughout the metal. This metal is useful in venting gases.

Like the pin and washer vents, the sintered metal vents can vary in number, size and placement on the core. In one embodiment the sintered metal is used in the same manner as the washer vent in terms of placement and number. Sintered metal vents are illustrated in Inventive Examples 7 and 8.

Molding Conditions

In the process of this invention, the mold is chilled, i.e., it is maintained at a temperature less than that of the injected polymer. Typically, the temperature of the mold prior to the injection of the polymer is less than 250° C., more typically less than 200° C. and even more typically less than 150° C., than that of the injected polymer. The internal temperature of the mold is typically measured through the use of a thermocouple probe. In one embodiment the internal mold temperature prior to injection of the insulation polymer is 10° C. to 20° C., or 12° C. to 18° C. The mold and core can be chilled or heated by any convenient means.

The temperature of the injected polymer just prior to injection into the mold is typically from 80° C. to 200° C., more typically from 100° C. to 200° C. and even more typically from 120° C. to 180° C. The polymer is typically injected into the mold under high pressure, i.e., at a pressure from 1 MPa to 300 MPa, more typically from 20 MPa to 200 MPa and even more typically from 25 MPa to 150 MPa.

The vacuum drawn on them mold prior to, during and/or after the injection of the polymer is typically (gauge pressure below atmospheric pressure), from 0 mmHg to 760 mmHg, more typically from 200 mmHg to 760 mmHg and even more typically from 500 mmHg to 760 mmHg. The vacuum can be drawn in any convenient manner through one or both ends of the core vents.

In-mold time of the injected polymer can vary widely but is usually only so long as to ensure sufficient green strength of the molded part that its structural integrity is maintained during de-molding and subsequent latent cure, i.e., cure outside of the mold. Typical in-mold time is from 1 to 10 minutes, more typically from 1 to 5 minutes.

Crosslinkable, Thermoplastic Polymer

Virtually any crosslinkable, thermoplastic polymers can be used in the practice of this invention. Nonlimiting examples of suitable polymers include styrenic block copolymers (e.g., SEBS), ethylene-based elastomers/plastomers (e.g., ENGAGE™ and AFFINITY ethylene-based copolymers), ethylene block copolymers (OBCs) (e.g., INFUSE™ 9507 or 9100 OBC), propylene-based plastomers and elastomers (e.g. VERSIFY™ 3300 and 4200), ethylene-propylene rubbers (EPR), ethylene/propylene/diene monomer rubbers (EPDM), and silicone rubber.

Other TPE polymers useful in the practice of this invention include, for example, but are not limited to, thermoplastic urethane (TPU), ethylene/vinyl acetate (EVA) copolymers (e.g., ELVAX 40L-03 (40% VA, 3MI) (DuPont)), ethylene/ethyl acrylate (EEA) copolymers (e.g., AMPLIFY) and ethylene acrylic acid (EAA) copolymers (e.g., PRIMACOR) (The Dow Chemical Company), polyvinylchloride (PVC), epoxy resins, styrene acrylonitrile (SAN) rubber, and Noryl® modified PPE resin (amorphous blend of polyphenylene oxide (PPO) and polystyrene (PS) by SABIC), among others. Also useful are olefinic elastomers including, for example, very low density polyethylene (VLDPE) (e.g., FLEXOMER® ethylene/1-hexene polyethylene, The Dow Chemical Company), homogeneously branched, linear ethylene/α-olefin copolymers (e.g. TAFMER® by Mitsui Petrochemicals Company Limited and EXACT® by DEXPlastomers), and homogeneously branched, substantially linear ethylene/α-olefin polymers (e.g., AFFINITY® ethyleneoctene plastomers (e.g., EG8200 (PE)) and ENGAGE® polyolefin elastomers, The Dow Chemical Company). Substantially linear ethylene copolymers are more fully described in U.S. Pat. Nos. 5,272,236, 5,278,272 and 5,986,028. Additional olefinic interpolymers useful in the present invention include heterogeneously branched ethylene-based interpolymers including, but are not limited to, linear medium density polyethylene (LMDPE), linear low density polyethylene (LLDPE), and ultra low density polyethylene (ULDPE). Commercial polymers include DOWLEX™ polymers, ATTANE™ polymer, FLEXOMER™, HPDE 3364 and HPDE 8007 polymers (The Dow Chemical Company), ESCORENE™ and EXCEED™ polymers (Exxon Mobil Chemical). Nonlimiting examples of suitable TPUs include PELLETHANE™ elastomers (Lubrizol Corp. (e.g., TPU 2103-90A); ESTANE™, TECOFLEX™, CARBOTHANE™, TECOPHILIC™, TECOPLAST™ and TECOTHANE™ (Noveon); ELASTOLLAN™, etc. (BASF), and commercial TPUs available from Bayer, Huntsman, the Lubrizol Corporation and Merquinsa.

The crosslinkable, thermoplastic polymers used in the practice of this invention are used in the same manner as like polymers in other injection molding processes. The polymer is reduced to a highly viscous melt, typically having a Melt Flow Index ($I_2$ measured at 190 C, 2.16 kg, ASTM D1238) ranging typical from 0.1 to 1000 grams/10 min; or more typically from 1 to 200 grams/10 min and even more typically from 3 to 50 grams/10 min and injected into the mold cavity under high pressure through one or more injection ports.

Deformable, Pre-molded Polymeric Sheets

Virtually any electrically semi-conductive polymer that can be pre-molded as a formed sheet, inserted into the mold cavity as a sheet to serve as a layer in a molded, multi-layer article, and is deformable with contact from the injected polymer under injection pressure can be used in the practice of this invention. Illustrative of the base polymers from which semi-conductive compounds can be made into sheets and molded are the thermoplastic polymers described above. The sheets can be formed by any conventional process, e.g., extrusion, cast molding, etc., and may contain structural features, e.g., ribs, to enhance their resistance to deformation during the injection molding process.

Molded Article

In one embodiment the molded article is a multi-layer electrical part comprising a thick insulation core sandwiched between two thin semiconductive layers. The two semiconductive layers typically are of the same composition and contain additives and fillers typical for a semiconductor function, e.g., a conductive carbon compound such as carbon black, while the insulation core contains additives and fillers typical for an insulation function, e.g., non-conductive fillers, fire retardants, etc. In one embodiment the molded article contains more than three layers.

SPECIFIC EMBODIMENTS

Comparative Example 1

Figure 4:
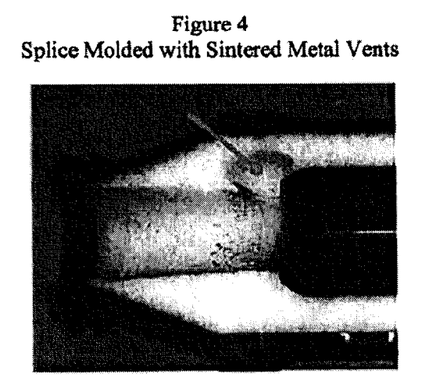
FIG. 4 is a photograph of the splice molded on a solid steel core as described in Comparative Example 1.

Cable splices are produced in a closed mold. The semiconductive layers are molded off-line using the same semiconductive Compound 1 as reported in the Composition Table and then assembled to a core to produce the insulation layer. The composition of the insulation layers is also reported in the Compositions Table below. The insulation polymer is injected at a melt temperature of 130° C. When the insulation material is molded on a solid steel core, trapped air in the mold created a large void near the end of the inner semiconductive component as shown in FIG. 4. Small channels are molded at the ends of the jacket (as seen on commercially available parts) to provide a path for the trapped air to escape the cavity but are not sufficient to remove all of the trapped air. Microscopy evaluation shows that trapped air is also forced into the surface of the insulation material and forms a foamy structure. These air bubbles can cause the material to become discolored, and would be commercially unacceptable.

TABLE

Compositions of the Semiconductor Layers and the Insulation Layer

| Material | Semiconductive Compound #1 (wt %) | Semiconductive Compound #2 (wt %) | Insulation Compound for all cases (wt %) |
|---|---|---|---|
| ENGAGE 8200 | | | 40.48 |
| ENGAGE 7467 | | | 40.49 |
| Nordel EPDM 3430 | 34.00 | 35.00 | |
| Silicone Rubber GP 130-25 | 31.50 | | |
| Nordel EPDM IP 3722 | | 14.00 | |
| Translink 37 | | | 2.00 |
| Carbon Black XC-500 | 22.00 | 35.00 | |
| Zinc Oxide | 2.00 | 2.00 | |
| PDMS Q-3563 | | | 5.00 |
| VTMS | | | 2.00 |
| VTES | 1.00 | | |
| L-101 peroxide | | | 0.03 |
| Perkadox 14S FL | 1.00 | | |
| Perkadox BC FF | 1.00 | 2.00 | |
| ELEVAST R-150 | | | 10.00 |
| SUNPAR OIL | 7.50 | 12.00 | |
| Total | 100.00 | 100.00 | 100.00 |

ENGAGE 8200 is an ethylene/1-octene elastomer having a density of 0.870 g/cm³ (ASTM D 792), an $I_2$ of 5 dg/min (ASTM D 1238, 190° C./2.16 kg), and is available from The Dow Chemical Company.

ENGAGE 7467 is an ethylene/1-butene elastomer having a density of 0.862 g/cm³ (ASTM D 792), an $I_2$ of 1.2 dg/min (ASTM D 1238, 190° C./2.16 kg), and is available from The Dow Chemical Company.

NORDEL EPDM IP 3430 is an amorphous ethylene-propylene-diene terpolymer hydrocarbon rubber having a density of 0.860 g/cm³, ethylene content 42 wt %, ethylidenenorbornene (ENB) content 0.8 wt % and a Mooney viscosity of 27 from The Dow Chemical Company.

NORDEL EPDM IP 3722 is a semi-crystalline ethylene-propylene-diene terpolymer hydrocarbon rubber having a density of 0.870 g/cm³, ethylene content 70.5 wt %, ENB content 0.5 wt % and a Mooney viscosity of 20 from The Dow Chemical Company.

GP 130-25 is a silicone rubber from Dow Corning Corporation.

VULCAN XC-500 is a conductive carbon black from Cabot Corp.

TRANSLINK 37 is a calcined and surface-treated alumino-silicate available from BASF.

PDMS Q-3563 is polydimethylsiloxane.

VTMS is vinyl trimethoxy silane.

VTES vinyl triethoxy silane.

L-101 is 2,5-bis(tert-butylperoxy)-2,5-dimethylhexane from Arkema Corp.

PERKADOX 14S FL is di(tert-butylperoxyisopropyl) benzene, peroxide flakes from Akzo Nobel Corp.

PERKADOX BC FF is Dicumyl peroxide, solid also from Akzo Nobel Corp.

ELEVAST R-150 is liquid polymer modifier available from the ExxonMobil Chemical Company.

SUNPAR oil is a paraffinic oil.

Comparative Example 2

Figure 5:
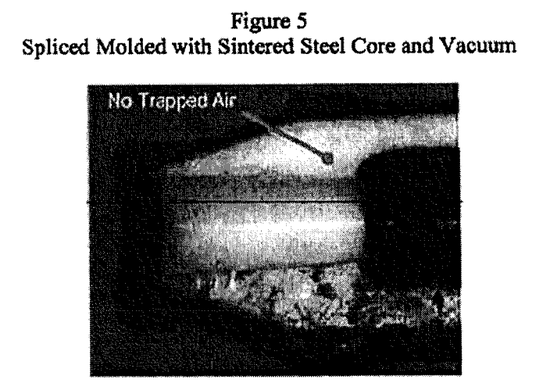
FIG. 5 is a photograph of a sintered metal vented core on a molded part as described in Comparative Example 2.
Figure 7:
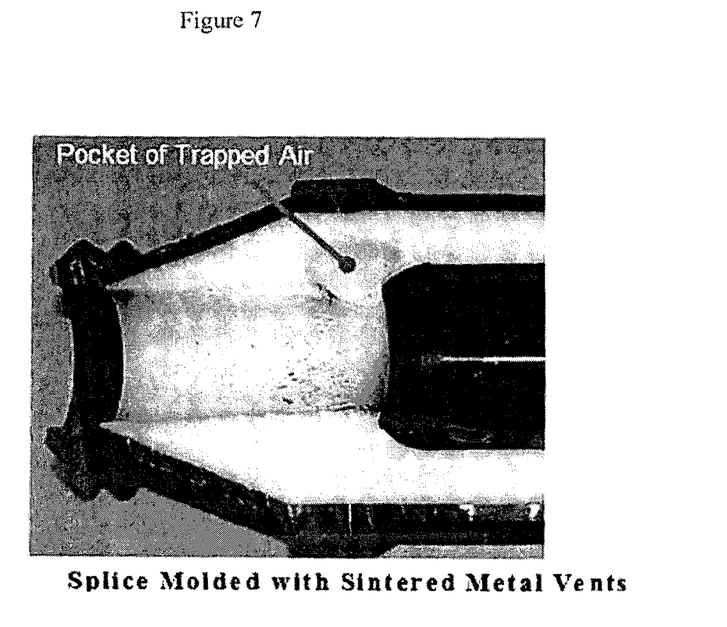
FIG. 7 is a photograph of a splice molded with sintered metal vents and with a pocket of trapped air as described in Comparative Example 2.

The inner and the outer semiconductive components are pre-molded using semi-conductive compound 2 and are assembled to the steel core for insulation molding. The core with the semiconductive components is inserted in the mold cavity, and the cavity is closed. As the insulation material filled this cavity, there is no place for the air to escape. Therefore, a vented core as shown in FIGS. 4 and 5 is designed to allow the trapped air to escape through the center of the core where the insulation contacted the core. The vented core is made of multiple sections. Sintered steel sections (7 micron (µm) and 20 µm PORCERAX®) are in contact with the insulation material and allowed air to pass through to the center of the core. The other sections of the core are made of solid steel. Using the vented core creates a defect that looks different than the defect created with the solid steel core. The trapped air creates a pocket that is partially sealed at the surface of the core as shown in FIG. 7. Therefore, the trapped air problem is not resolved. This defect would also not be commercially acceptable.

INVENTIVE EXAMPLE 1

Figure 6:
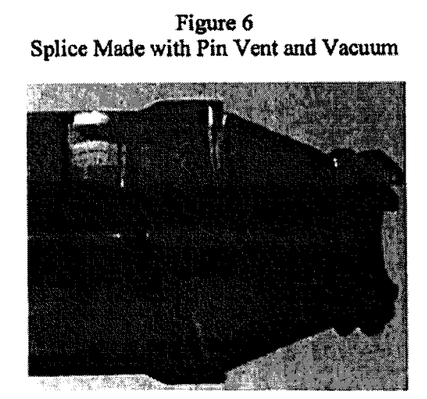
FIG. 6 is a photograph of a sintered metal vented core design as described in Comparative Example 2.

This example illustrates the inventive approach to resolve the molding defect. The semi-conductive layers are pre-molded using semi-conductive compound 2. The methods developed consist of combining a vented core design as shown in FIG. 6 with application of vacuum. After closing of the mold, the vacuum is applied to the insulation cavity during the filling step. Applying a 25 in-Hg vacuum through the center of the core results in removal of the trapped air defect from the molded splices as shown in FIG. 6.

INVENTIVE EXAMPLE 2

Figure 8:
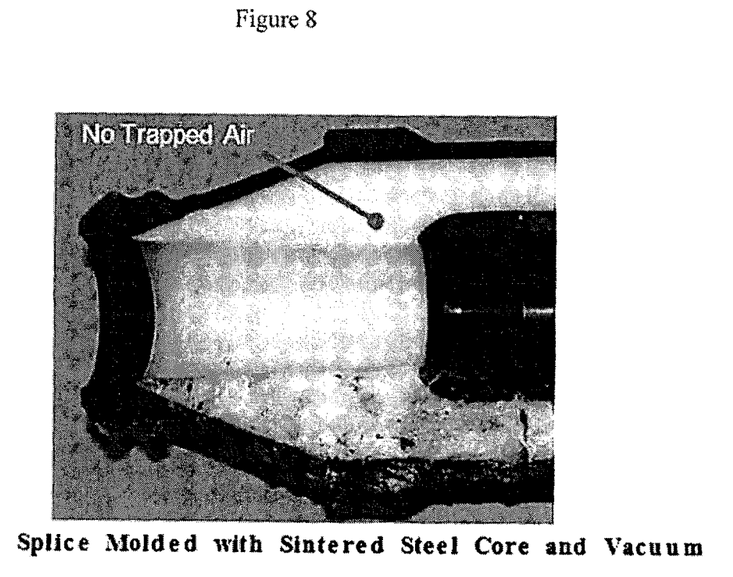
FIG. 8 is a photograph of a splice molded with sintered steel core and vacuum and without trapped air as described in Inventive Example 1.
Figure 9:
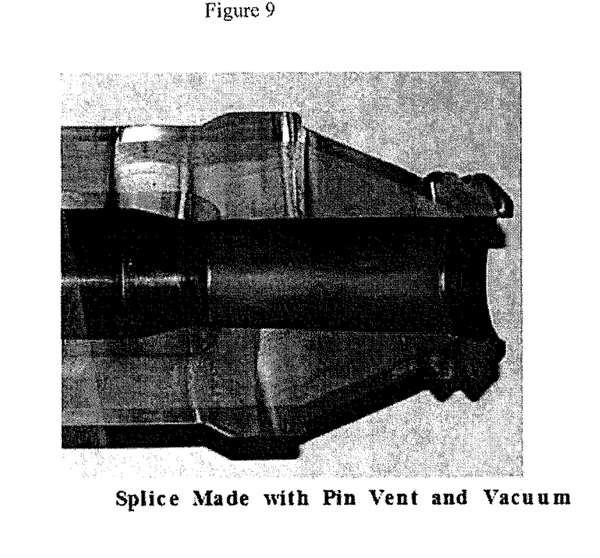
FIG. 9 is a photograph of a splice made with pin vent and vacuum as described in Inventive Example 2.

In this example, the semi-conductive layers are pre-molded using semi-conductive compound 2. The part is molded using a vented core with pin vents combined with applying a 25 in-Hg vacuum. The pin vents are holes in the core that extended radially from the center of the core to the outside surface in the insulation area. A through hole in the core then connects these pin cross holes to the vacuum. The resulting part is void free as shown in FIGS. 8 and 9.

INVENTIVE EXAMPLE 3

Pin Vent Design, 1$^{st}$ Version

Figure 10:
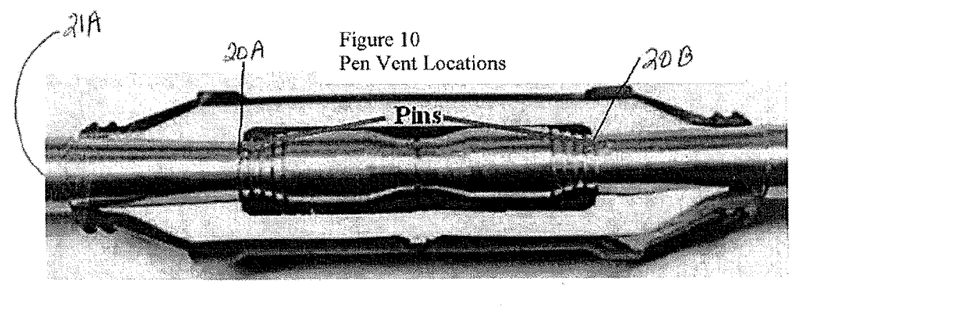
FIG. 10 is a photograph of a splice mold showing the location of pin vents on a core.

In this example pin vents 20A and 20B are constructed on core 21A to eliminate a void between the semiconductor and insulation layers. The semi-conductive layers are pre-molded using semi-conductive compound 2. Core 21A with pin vents 20A and 20B is produced and tested in a molding trial. Pin vents 20A and 20B are placed at the edges of the inner semiconductor layer where the voids in the insulation are located. The locations of these pin vents are shown in FIG. 10.

Figure 11A:
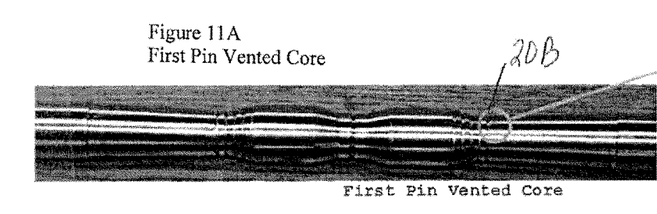
FIGS. 11A and 11B are photographs of a splice mold showing the location of pin vent with a machined flat.
Figure 11B:
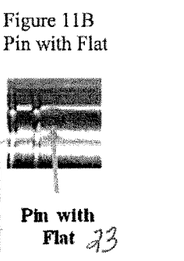
Figures 12A, 12B:
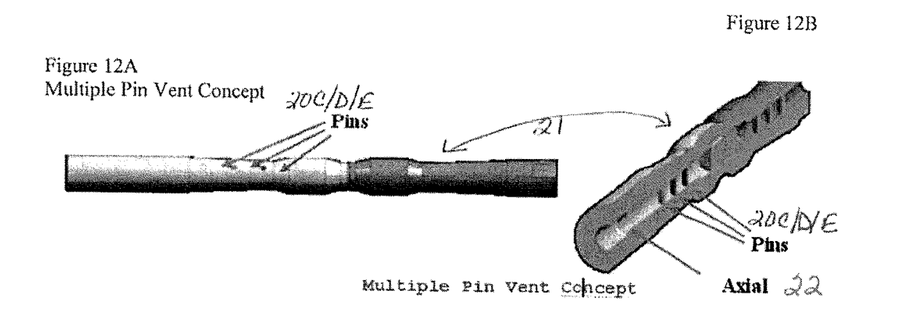
FIGS. 12A and 12B are photographs of a splice mold with a core having multiple pin vents.

A close up view of core 21A is shown in FIG. 11A. To make the vent, an axial hole (illustrated as 22 on core 21B of FIG. 12B) is drilled through the center of core 21A. Then a cross hole (not shown) is drilled perpendicular to the axis near the end of the inner semiconductor component. Pin 23 is then machined to produce a small axial flat (not shown) along the length of the pin. Pin 23 is then pressed into the cross hole of core 21A. The flat machined on pin 23 produces a small channel (about 0.005 inch wide, not shown) that vents to the center hole, and then out of the mold.

INVENTIVE EXAMPLE 4

Pin Vent Design, 2$^{nd}$ Version

In this example, the semi-conductive layers are also pre-molded using semi-conductive compound 2. Another version of the pin vent design is fabricated and tested in another molding trial. This second version has three pins (20C, 20D and 20E) on each end of core 21B (shown assembled in FIG. 12A and in cross-section in FIG. 12B). This concept provides more paths for trapped air to escape in case some of the vents plug with polymeric material during molding. The vents are also of a reduced size from the first version design. The target width of the vent is 0.001 inches.

INVENTIVE EXAMPLE 5

Washer Vent Design

In this example, the semi-conductive layers are also pre-molded using semi-conductive compound 2. Another vent design for the removable core is developed to provide more venting area near the end of the inner semiconductive component (i.e., the deformable, pre-molded polymeric sheets) at the surface of the insulation material. The concept consists of multiple sections of a core that are assembled together. The vents are formed from stacked metal washer components on the core in the desired vent location.

Figure 13:
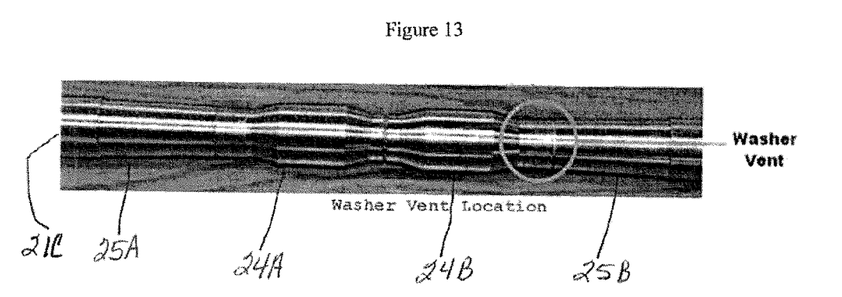
FIG. 13 is a photograph of a splice mold with a core having a washer vent design.
Figure 14A:
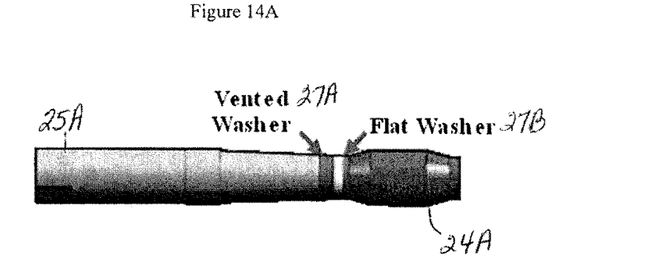
FIGS. 14A and 14B are full and cross-section drawings, respectively, of a splice mold with a vented washer arrangement.
Figure 14B:
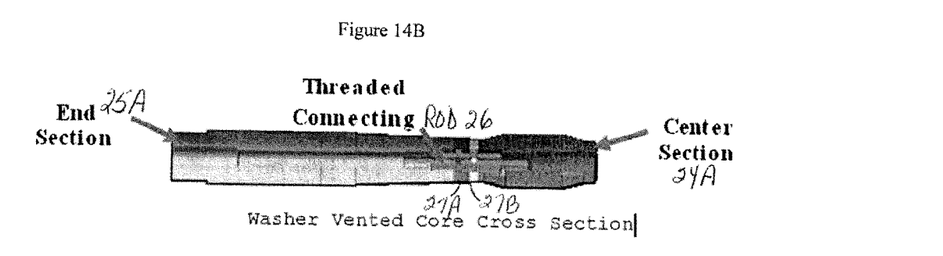

As shown in FIG. 13, core 21C has center sections 24A and 24B and end sections 25A and 25B that are joined together with threaded connecting rod 26 as shown in FIG. 14B. Washer components 27A and 27B slide onto the connecting rods (FIG. 15A) and are then sandwiched between the end and the center components when the threads on the connecting rod are tightened. The end sections of the core and the threaded rod have axial through holes (one of which is illustrated as 28 in FIG. 15A). The threaded connecting rods also have cross holes (not shown) perpendicular to the axis that connects the axial holes to the vents formed by the washers.

Figures 15A, 15B, 15C:
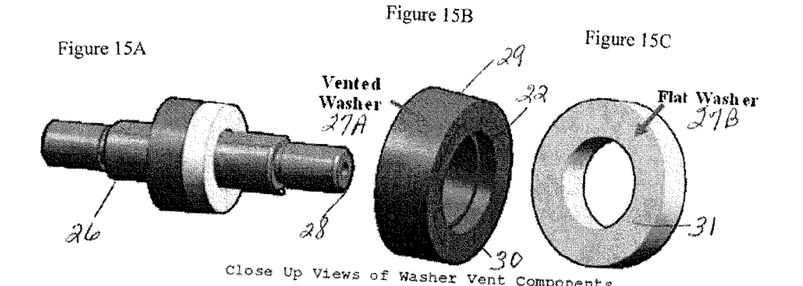
FIGS. 15A, 15B and 15C are drawings of an assembled core with a vented washer arrangement, and its component vented and flat washers, respectively.
Figure 16:
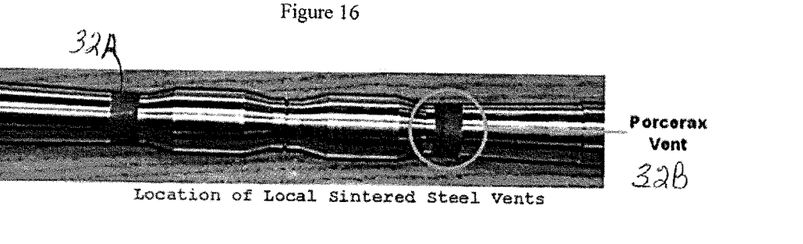
FIG. 16 is a photograph of a core equipped with sintered steel vent.

Washer 27B is flat and washer 27A has 0.002 inch deep channel 29 machined into washer face 30 as shown in FIG. 15B. When the machined face of washer 27A is placed against face 31 of washer 27B (FIG. 15C), 0.002 inch channels are created to allow trapped air to escape through the center of the core. Material is removed around the entire perimeter of the vented washer to provide continuous venting in the desired axial location of the core (as shown by recess 32 in vented washer 27A of FIG. 15B). Channels (not shown) are then cut to connect the outer perimeter of the washer to the center of the washer. Vents are produced using this design with anticipation that better dimensional control of the vent can be achieved compared to the pin vent design.

INVENTIVE EXAMPLE 6

Local Sintered Steel Vent Design

In this example, the semi-conductive layers are also pre-molded using semi-conductive compound 2. In another embodiment a porous sintered steel vent is designed and evaluated. This design uses almost all of the same components as the washer vent design. The difference is that the washer components are replaced with a single disk of PORCERAX sintered steel (32A and 32B on core 21D of FIG. 19).

Figure 17A:
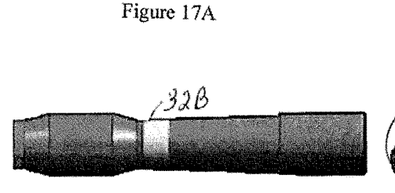
FIGS. 17A and 17B are drawings of an assemble and disassembled core equipped with a PORCERAX sintered steel vent, respectively.
Figure 17B:
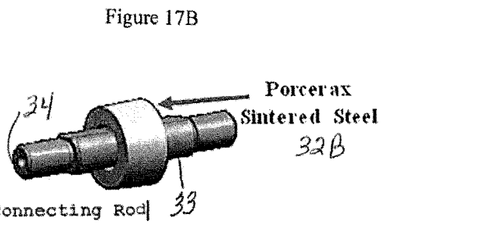

As show in FIGS. 17A and 17B, sintered steel disk 32B is slid over threaded connecting rod 33 which is then tightened together with the other core pieces so the sintered steel disk is slightly compressed. The intent is for the trapped air to pass though the pores of the sintered steel, then through cross holes (not shown) in the connecting rod, and finally out through axial hole 34 of the other core components.

The sintered steel disks are made from material that has 30 micron pore sizes. The components are produced on a wire EDM machine since this process would leave the pores on the outside surface open. Traditional metal cutting process and grinding would close the pores and prevent any venting through the part.

INVENTIVE EXAMPLE 7

Full Sintered Steel Vent Design

Figure 18:
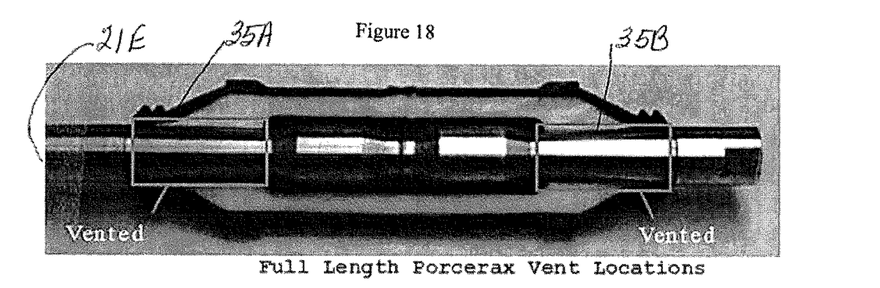
FIG. 18 is a photograph of a core equipped with a full length PORCERAX steel vent.

In this example, the semi-conductive layers are also pre-molded using semi-conductive compound 2. Based on observation from molding with the previously discussed vented cores, a full length sintered metal vented core is evaluated. This design takes advantage of the good venting properties of sintered steel metal and provides vent paths over the entire length of the insulation that is in contact with the core. This reduces the risk of having trapped air defects or foamy structured insulation material at the end of fill. Vented areas 35A and 35B on the core are shown in FIG. 18.

Figures 19A, 19B:
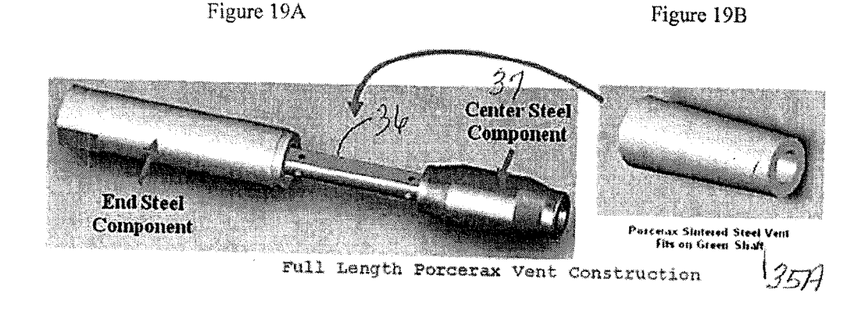
FIGS. 19A and 19B are drawings of a core with a full length PORCERAX steel vent removed and the removed PORCERAX steel vent, respectively.
Figure 20:
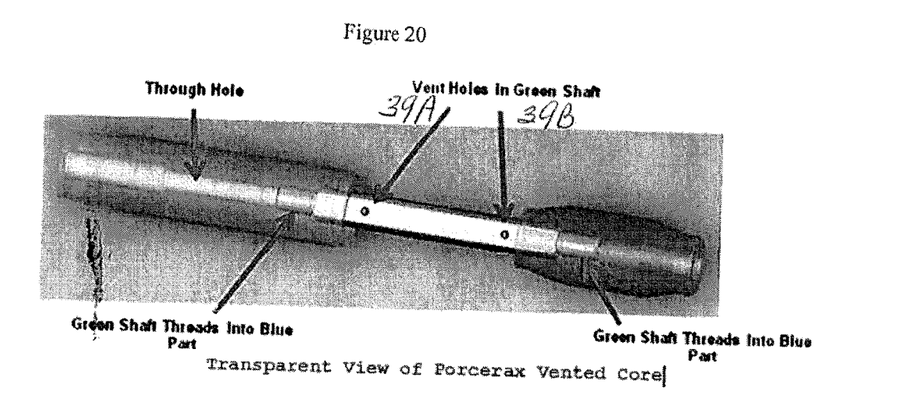
FIG. 20 is a transparent view of a PORCERAX vented core.

The construction of full length, or sleeve, sintered metal core is very similar to the sintered metal disk vented core described in Inventive Example 6. As shown in FIGS. 19A and 19B, sintered metal sleeve 35A fits over threaded connecting rod 36. This connecting rod allows center steel component 37 and end steel component 38 to tighten together to compress sintered steel sleeve 35A as shown in FIG. 19A. The sintered steel and solid steel joints are placed under the edges of both the inner and the outer semiconductor components to help prevent flash between the joints if the core is not tightly assembled together. The trapped air can pass through the pores of the sintered steel, through cross holes 39A and 39B of connecting rod 36 (FIG. 20), and then out through the center hole of the core (not shown).

The PORCERAX sintered steel sleeve are also manufactured on a wire EDM machine. Material with both 20 and 7 micron pore sizes are produced for evaluation. The outer surface of some of the sintered steel parts are polished with 320 grit paper to evaluate if the pores stay open and vent the trapped air while providing a smooth surface finish on the molded insulation material.

It is specifically intended that the present invention not be limited to the embodiments and illustrations contained herein, but include modified forms of those embodiments including portions of the embodiments and combinations of elements of different embodiments as come within the scope of the following claims.

We claim:

1. A process for making a multilayered article, the process comprising the steps of:
    (A) providing a mold comprising:
        (1) a mold housing comprising (a) at least one injection port, and (b) defining a mold cavity within which are positioned two deformable, pre-molded polymeric sheets; and
        (2) a removable, hollow core equipped with at least one vent and having a center section connected to an end section by a threaded connecting rod, the removable, hollow core positioned between and spaced apart from the two polymeric sheets;
    (B) chilling the mold to an internal mold temperature from 10° C. to 20° C.;
    (C) injecting at a pressure of 1 MPa to 300 MPa a viscous, crosslinkable, thermoplastic polymer into the mold cavity between the two polymeric sheets and around the removable core,
    (D) drawing a vacuum on the mold cavity through the vent in the removable, hollow core before, during and/or after the polymer has been injected into the mold;
    (E) forming a less than fully cured multilayered article in the mold cavity; and
    (F) removing the less than fully cured multilayer article from the mold cavity.

2. A mold comprising:
    (A) A mold housing comprising (a) at least one injection port, and (b) defining a mold cavity within which are positioned two deformable, pre-molded polymeric sheets; and
    (B) A removable, hollow core that is multi-segmented comprising two or more center segments and two end segments, and a sintered metal vent having a porosity from 20% to 30% by volume between each end segment and a center segment, the removable, hollow core positioned between and spaced apart from the two polymeric sheets;
    (C) a vacuum pulling apparatus comprising a compressed air powered vacuum pulling system attached to the removable, hollow core and operable to draw a pressure on the mold through each sintered metal vent.

3. The process of claim 1 in which the temperature of the mold is at least 150° C. less than the temperature of the injected polymer.

4. The process of claim 1 in which the vacuum drawn on the mold before, during or after the injection of the polymer is from 200 mm-Hg to 760 mm-Hg.

5. The mold of claim 2 in which the sintered metal vent is in the form of a sleeve.

6. The process of claim 1 comprising providing the removable, hollow core equipped with a sintered metal vent having a porosity from 20% to 30% by volume.

7. The process of claim 1 comprising injecting the thermoplastic polymer at a pressure from 25 MPa to 150 MPa.

8. The process of claim 1 comprising
    forming a core assembly comprising (i) the removable, hollow core, (ii) an inner deformable, pre-molded polymeric sheet, and (iii) an outer deformable, pre-molded polymeric sheet by
        (a) mounting the inner deformable, pre-molded polymeric sheet on the removable, hollow core;
        (b) mounting the outer deformable, pre-molded polymeric sheet on the removable, hollow core, covering the inner deformable, pre-molded polymeric sheet completely and defining a space between the inner deformable, pre-molded polymeric sheet and the outer deformable, pre-molded polymeric sheet;
    placing the core assembly in the mold housing; and
    injecting the thermoplastic polymer into the space between the inner deformable, pre-molded polymeric sheet and the outer deformable, pre-molded polymeric sheet.

9. A process for making a multilayered article, the process comprising the steps of:
    (A) providing a removable, hollow core equipped with at least one vent and having a center section connected to an end section by a threaded connecting rod, the removable, hollow core having
   (1) two washer components on the connecting rod and sandwiched between the center section and the end section; and
   (2) one washer component comprising a channel machined into a washer face, the channel forming the vent and allowing air to move to the center of the core;
(B) providing a mold comprising
   (1) a mold housing comprising (a) at least one injection port, and (b) defining a mold cavity within which are positioned two deformable, pre-molded polymeric sheets; and
   (2) the removable, hollow core positioned between and spaced apart from the two polymeric sheets;
(C) chilling the mold to an internal mold temperature from 10° C. to 20° C.;
(D) injecting at a pressure of 1 MPa to 300 MPa a viscous, crosslinkable, thermoplastic polymer into the mold cavity between the two polymeric sheets and around the removable core,
(E) drawing a vacuum on the mold cavity through the vent in the removable, hollow core before, during and/or after the polymer has been injected into the mold;
(F) forming a less than fully cured multilayered article in the mold cavity; and
(G) removing the less than fully cured multilayer article from the mold cavity.

* * * * *